Patented May 14, 1940

2,200,373

UNITED STATES PATENT OFFICE 2,200,373

MANUFACTURE OF TITANIUM DIOXIDE PIGMENTS

Assur Gjessing Oppegaard and Charles J. Stopford, Eaglescliff, England, assignors to Titan Company, Inc., Wilmington, Del., a corporation of Delaware No Drawing. Application June 7, 1939, Serial No. 277,890. In Great Britain June 23, 1938

11 Claims. (Cl. 134—58)

The present invention relates to the manufacture of titanium dioxide pigments and has reference both to essentially pure titanium dioxide pigments and to composite titanium dioxide pigments in which titanium dioxide is intimately associated with an extender such as barium sulfate, calcium sulfate, etc.

Among the objects of the present invention is the production of titanium dioxide pigments and composites thereof having improved properties with regard to brightness, color tone, fastness to light and softness.

Titanium pigments are manufactured at the present time by a process which may be broadly described as follows:

Ground ilmenite ore is mixed with sulfuric acid and water to bring about a reaction which results in the formation of a cake consisting of water-soluble iron and titanium surfates. This cake is dissolved in water or weak surfuric acid, and the solution is then subjected to a reducing treatment, clarified and subjected to low temperature crystallization to remove partly the ferrous sulfate present. The clarified solution is then concentrated to a pre-determined titanium content, after which it is introduced into a hydrolysis and precipitating tank and subjected to thermal hydrolysis. When the titanium has been largely precipitated as a hydrate, it is separated from the acid hydrolysis mother-liquor and subjected to an exhaustive filtration and washing treatment, designed to eliminate as many of the discoloring impurities present as may be possible. After the filtration the hydrous titanium oxide is a practically pure white material containing adsorbed or combined sulfuric acid and water. It is then fed to a calciner and subjected to a pre-determined temperature, usually about 800–1100° C. to develop crystalline structure and pigment properties.

The precise temperature within this range at which the calcination will be carried out in order to obtain the maximum tinting strength and hiding power will depend upon the quality of the precipitate obtained. After calcination the material is then pulverized in order to break down aggregates formed during the calcination, thus reducing it to the fine particle size which characterizes pigmentary material.

It has been observed that if the calcination is carried out in order to obtain maximum tinting strength and hiding power, these desirable results are usually accompanied by a tendency of the pigment to acquire a greyish, yellowish or reddish tone, and to manifest in some cases a lack of fastness to light and also an excessive hardness, rendering the pigment difficult to grind.

The prior art has striven diligently to devise means for eliminating the above disadvantages and various methods have been proposed. The most important of these now in use involves the addition to the hydrous titanium oxide, before calcination, of certain compounds, e. g., phosphoric acid and phosphates of different kinds, fluorine compounds, soluble alkali metal compounds and antimony compounds. Boric acid and borates have also been proposed.

We have now found a new and improved method of overcoming the undesirable effects encountered on calcination. It consists in a process for the production of titanium dioxide pigments and composites thereof which comprises the calcination of precipitated and washed hydrous titanium oxide wherein the hydrous titanium oxide subjected to calcination has mixed with it a controlled amount of columbium or tantalum or a compound of either or a mixture of columbium and tantalum or of compounds of the same so that the columbium or tantalum or columbium-tantalum content is between about 0.01% and about 2% calculated on the $TiO_2$ content of the mixture, the regulated composition of the calcination mixture being obtained either by the addition of columbium or tantalum or a compound of either or a mixture of the same, or by blending titanium ores one or more of which contains naturally a proportion of columbium or tantalum.

The columbium or tantalum or a compound of either or a mixture of columbiaum and tantalum or compounds of the same may be added at any time prior to calcination. Thus, the addition may be made to the titanium ore used for the preparation of the titanium solution or to the titanium solution in the form of soluble salts or solutions thereof before precipitation of the hydrous titanium oxide or to the washed hydrous titanium oxide before calcination.

Columbium compounds found useful for the exercise of the present invention are among others columbium oxide and columbium ores, e. g., columbite.

The columbium or tantalum or a compound of either or a mixture of columbium and tantalum or of compounds of the same may form the only addition agent or may be used in combination with other addition agents hitherto used.

To more specifically illustrate the present invention the following examples are given:

Example I 1000 grams of ilmenite were mixed with 510 cc. of 93% $H_2SO_4$ and 2 cc. of commercial phosphoric acid to which was then added 0.2% columbite based on the $TiO_2$ content of the ilmenite. This mixture was then added to 370 cc. of 93% $H_2SO_4$ previously heated to 130° C. in a cast iron pan. The batch was heated to fumes with vigorous stirring when 40 cc. of water were added to start the reaction. The reaction was completed with vigorous stirring and the mass baked for 30 minutes at 200° C. when it was ground, dissolved in water at 60° C., adjusted to a gravity of 1.5 and reduced with scrap iron to a $Ti_2O_3$ content of 3.0 grams per liter.

The solution was cooled to 27° C. and filtered. The solution was subsequently concentrated to a specific gravity of 1.60 and hydrolyzed in a laboratory autoclave, using 20 pounds superpressure, the boiling time being 80 minutes. After washing and leaching with zinc dust in 4% acid $H_2SO_4$ at 60° C. the products were calcined with 0.6% potassium carbonate at a temperature of 970° C. for 3 hours.

It was observed that the addition of the columbium resulted in the production of a pigment having a high degree of brightness, an attractive blue tone, strong fastness to light and softness. It was further observed that with regard to brightness, tone and fastness to light as little as 0.01% or less columbium was effective, while with regard to the softness of the calcined pigment as little as 0.1% columbium was effective.

Another improved result brought about by the addition of columbium according to the present invention lay in the fact that the titanium dioxide pigment could be subjected to a more intense calcination than formerly thus to develop maximum tinting strength and hiding power without adversely affecting the abovementioned desirable properties. It was further noted that the temperature range for optimum calcination was considerably increased and that in general, calcination temperatures above 925° C. and in fact up to about 1100° C. could be used when working according to the present invention.

Improved results similar to those obtained with columbium and columbium compounds were also obtained when employing tantalum or tantalum compounds or a mixture of columbium and tantalum or of columbium compounds and tantalum compounds.

The process of the present invention is applicable not only to the production of pure titanium dioxide pigments but also to the production of other titanium pigments, for example, composite titanium dioxide pigments comprising titanium dioxide and a carrier or extender such as barium and calcium sulfate.

The foregoing description and examples of the present invention have been given for illustrative purposes and for clearness of understanding and no undue limitations should be deduced therefrom but the appended claims should be construed as broadly as possible in view of the prior art.

In this connection it is to be noted that we have referred to the product of the hydrolysis of titanium-containing solutions as hydrous titanium oxide. This product has been variously called in the patent and scientific literature hydrated titanium oxide, basic titanium sulfate, metatitanic acid, etc. Of course no limitations are to be implied in our use of the terminology "hydrous titanium oxide."

We claim:

1. The process of preparing a titanium dioxide pigment having improved properties with regard to brightness, tone, fastness to light and softness which comprises decomposing a titaniferous ore to obtain the titanium values thereof in the form of a titanium salt solution, and recovering hydrous titanium oxide from the said solution, and which includes mixing with the titanium pigment forming material at any stage of the process prior to calcination, a controlled small amount of at least one of the substances selected from the group consisting of columbium, tantalum, compounds of columbium and compounds of tantalum, calcining the mixture thus obtained and pulverizing the same.

2. The process of preparing a titanium dioxide pigment having improved properties with regard to brightness, tone, fastness to light and softness which comprises decomposing a titaniferous ore to obtain the titanium values thereof in the form of a titanium salt solution, and recovering hydrous titanium oxide from the said solution, and which includes mixing with the titanium pigment forming material at any stage of the process prior to calcination, a controlled small amount of at least one of the substances selected from the group consisting of columbium, tantalum, compounds of columbium and compounds of tantalum, so that the columbium or tantalum content is between about 0.01 per cent and about 2 per cent based on the $TiO_2$ content of the mixture, calcining the mixture between about 700° C. and about 1100° C. and pulverizing the same.

3. The process of preparing a titanium dioxide pigment having improved properties with regard to brightness, tone, fastness to light and softness which comprises decomposing a titaniferous ore to obtain the titanium values thereof in the form of a titanium salt solution, and recovering hydrous titanium oxide from the said solution, and which includes mixing with the titanium pigment forming material at any stage of the process prior to calcination, about 0.2 per cent columbite based on the $TiO_2$ content of the mixture, calcining the mixture at about 970° C. for about 3 hours with about 0.6 per cent potassium carbonate, and pulverizing the same.

4. The process of preparing a titanium dioxide pigment having improved properties with regard to brightness, tone, fastness to light and softness which comprises decomposing a titaniferous ore to obtain the titanium values thereof in the form of a titanium salt solution, recovering hydrous titanium oxide from the said solution, mixing with the titanium pigment forming material thus recovered, at any stage of the process prior to calcination, an amount of tantalum between about 0.01 per cent and about 2 per cent based on the $TiO_2$ content of the mixture, calcining the mixture thus obtained and pulverizing the same.

5. The process of preparing a titanium dioxide pigment having improved properties with regard to brightness, tone, fastness to light and softness which comprises decomposing a titaniferous ore to obtain the titanium values thereof in the form of a titanium salt solution, recovering hydrous titanium oxide from the said solution, mixing with the titanium pigment forming material thus recovered, at any stage of the process prior to calcination, an amount of a columbium compound in which the columbium is about 0.01 per cent and about 2 per cent based on the $TiO_2$ content of the mixture, calcining the mixture thus obtained and pulverizing the same.

6. The process of preparing a titanium dioxide pigment having improved properties with regard to brightness, tone, fastness to light and softness which comprises decomposing a titaniferous ore to obtain the titanium values thereof in the form of a titanium salt solution, recovering hydrous titanium oxide from the said solution, mixing with the titanium pigment forming material thus recovered, at any stage of the process prior to calcination, an amount of a tantalum compound in which the tantalum is about 0.01 per cent and about 2 per cent based on the $TiO_2$ content of the mixture, calcining the mixture thus obtained and pulverizing the same.

7. The process of preparing a titanium dioxide pigment having improved properties with regard to brightness, tone, fastness to light and softness which comprises decomposing a titaniferous ore to obtain the titanium values thereof in the form of a titanium salt solution, recovering hydrous titanium oxide from the said solution, mixing with the titanium pigment forming material thus recovered, at any stage of the process prior to calcination, a controlled small amount of columbium and tantalum so that the columbium-tantalum content of the mixture is between about 0.01 per cent and about 2 per cent based on the $TiO_2$ content of the mixture, calcining the mixture thus obtained and pulverizing the same.

8. The process of preparing a titanium dioxide pigment having improved properties with regard to brightness, tone, fastness to light and softness which comprises decomposing a titaniferous ore to obtain the titanium values thereof in the form of a titanium salt solution, recovering hydrous titanium oxide from the said solution, mixing with the titanium pigment forming material thus recovered, at any stage of the process prior to calcination, a controlled small amount of a columbium compound and a tantalum compound so that the columbium-tantalum content is between about 0.01 per cent and about 2 per cent based on the $TiO_2$ content of the mixture, calcining the mixture thus obtained and pulverizing the same.

9. In the process of preparing a titanium dioxide pigment according to the process of claim 1 the step which comprises mixing prior to calcination with a titanium oxygen compound a controlled small amount of at least one of the substances selected from the group consisting of columbium, tantalum, compounds of columbium and compounds of tantalum.

10. In the process of preparing titanium dioxide composite pigments the step which comprises the hydrolytic precipitation of hydrous titanium oxide having associated therewith prior to calcination a controlled small amount of at least one of the substances selected from the group consisting of columbium, tantalum, compounds of columbium, and compounds of tantalum in the presence of an extender pigment.

11. In the process of preparing titanium dioxide composite pigments the step which comprises mixing particles of an extender pigment with particles of a titanium oxygen compound having associated therewith, prior to calcination, a controlled small amount of at least one of the substances selected from the group consisting of columbium, tantalum, compounds of columbium, and compounds of tantalum.

ASSUR GJESSING OPPEGAARD.
CHARLES J. STOPFORD.